United States Patent
Noguchi et al.

(10) Patent No.: US 10,801,999 B2
(45) Date of Patent: Oct. 13, 2020

(54) ROPE DAMAGE DIAGNOSTIC TESTING APPARATUS

(71) Applicant: MITSUBISHI ELECTRIC CORPORATION, Chiyoda-ku (JP)

(72) Inventors: Toyohiro Noguchi, Chiyoda-ku (JP); Jin Inoue, Chiyoda-ku (JP); Keita Mochizuki, Chiyoda-ku (JP); Akihide Shiratsuki, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 88 days.

(21) Appl. No.: 16/087,814

(22) PCT Filed: Apr. 22, 2016

(86) PCT No.: PCT/JP2016/062787
§ 371 (c)(1),
(2) Date: Sep. 24, 2018

(87) PCT Pub. No.: WO2017/183188
PCT Pub. Date: Oct. 26, 2017

(65) Prior Publication Data
US 2019/0086369 A1     Mar. 21, 2019

(51) Int. Cl.
G01N 29/24     (2006.01)
(52) U.S. Cl.
CPC ......... *G01N 29/2412* (2013.01); *G01N 29/24* (2013.01); *G01N 2291/2626* (2013.01)
(58) Field of Classification Search
CPC ............... G01N 29/2412; G01N 29/24; G01N 2291/2626
(Continued)

(56) References Cited

U.S. PATENT DOCUMENTS 4,827,215 A * 5/1989 van der Walt ......... G01N 27/82
324/227
8,098,065 B2  1/2012 Kwun et al.
(Continued)

FOREIGN PATENT DOCUMENTS

CN          103792279      *  5/2014
KR    10-2010-0102731 A       9/2010
(Continued)

OTHER PUBLICATIONS

Office Action dated Oct. 17, 2019 in corresponding Korean Patent Application No. 10-2018-7027162 (with English Translation), 7 pages.
(Continued)

*Primary Examiner* — Octavia Hollington
(74) *Attorney, Agent, or Firm* — Oblon, McClelland, Maier & Neustadt, L.L.P.

(57) ABSTRACT

In a rope damage diagnostic testing apparatus, an ultrasound applicator generates ultrasonic waves in a wire rope by making the wire rope vibrate due to magnetostriction effect. A detecting element detects changes in a state of propagation of the ultrasonic waves in the wire rope. An excitation coil and the detecting element are disposed in a parallelogram that has as a first opposite side length a length of a portion of the wire rope in which one of the outer layer strands makes one revolution around the wire rope, and that has as a second opposite side length a product of a diameter and number of the outer layer wires that are included in one of the outer layer strands.

9 Claims, 8 Drawing Sheets

(58) Field of Classification Search
USPC .......................................................... 73/732
See application file for complete search history.

(56) References Cited

U.S. PATENT DOCUMENTS

| | | | | |
|---|---|---|---|---|
| 9,075,023 | B2* | 7/2015 | Yoshioka | ................ G01N 27/83 |
| 9,103,798 | B2* | 8/2015 | Weischedel | ......... G01N 27/9033 |
| 2011/0006762 | A1 | 1/2011 | Yoshioka et al. | |
| 2013/0152541 | A1* | 6/2013 | Hashimoto | ................ F16C 1/02 |
| | | | | 57/243 |
| 2019/0079053 | A1* | 3/2019 | Hirota | .................... G01N 27/83 |

FOREIGN PATENT DOCUMENTS

| KR | 10-2011-0066411 A | 6/2011 |
|---|---|---|
| KR | 10-2015-0070993 A | 6/2015 |

OTHER PUBLICATIONS

International Search Report dated Jul. 12, 2016 in PCT/JP2016/062787 filed Apr. 22, 2016.

\* cited by examiner

ROPE DAMAGE DIAGNOSTIC TESTING APPARATUS

TECHNICAL FIELD

The present invention relates to a rope damage diagnostic testing apparatus that detects presence or absence of wire damage by generating ultrasonic vibration in a rope using magnetostriction effect.

BACKGROUND ART

In conventional wire rope magnetostrictive sensor probes, a plurality of magnets and a pair of coil assemblies are disposed so as to surround an entire circumference of a wire rope. A magnetostrictive strip is disposed between each of the coil assemblies and the wire rope.

Each of the magnets applies a direct current magnetic field to the wire rope and the magnetostrictive strip. Ultrasonic waves are applied to the wire rope by applying an alternating-current magnetic field using the coil assembly to make the magnetostrictive strip vibrate due to magnetostriction effect. Reflected ultrasound waves due to damage to the wire rope are detected by the coil assembly through reverse magnetostriction effect in the magnetostrictive strip (see Patent Literature 1, for example).

CITATION LIST

Patent Literature

[Patent Literature 1]
U.S. Pat. No. 8,098,065 (Gazette)

SUMMARY OF THE INVENTION

Problem to be Solved by the Invention

In conventional magnetostrictive sensor probes such as that described above, the probe surrounds the entire circumference of the wire rope in order to detect abnormalities around the entire circumference of the wire rope. Because of that, it takes time to mount the probe. Furthermore, the overall size of the probe is large, and if two or more wire ropes are disposed in close proximity, as in elevators, for example, it may not be possible to mount the probe.

The present invention aims to solve the above problems and an object of the present invention is to provide a rope damage diagnostic testing apparatus that can detect presence or absence of damage in a wire rope using a compact configuration, by facing only a circumferential portion of an outer circumferential surface of the wire rope.

Means For Solving The Problem

In a rope damage diagnostic testing apparatus that detects presence or absence of damage in a wire rope around an outer circumference of which are disposed a plurality of outer layer strands, each of the outer layer strands including a plurality of outer layer wires that are disposed around an outer circumference thereof, the rope damage diagnostic testing apparatus according to the present invention includes: an ultrasound applicator that includes: a magnet that applies a direct current magnetic field to the wire rope; and an excitation coil that applies an alternating-current magnetic field to the wire rope, the ultrasound applicator generating ultrasonic waves in the wire rope by making the wire rope vibrate due to magnetostriction effect; and a detector that includes a detecting element that detects changes in a state of propagation of the ultrasonic waves in the wire rope, and the excitation coil and the detecting element are disposed in a parallelogram that has as a first opposite side length a length of a portion of the wire rope in which one of the outer layer strands makes one revolution around the wire rope, and that has as a second opposite side length a product of a diameter and number of the outer layer wires that are included in one of the outer layer strands.

Effects of the Invention

In the rope damage diagnostic testing apparatus according to the present invention, because the excitation coil and the detecting element are disposed in a parallelogram that has as a first opposite side length a length of a portion of the wire rope in which one of the outer layer strands makes one revolution around the wire rope, and that has as a second opposite side length a product of a diameter and number of the outer layer wires that are included in one of the outer layer strands, presence or absence of damage in the wire rope can be detected using a compact configuration, by facing only a circumferential portion of an outer circumferential surface of the wire rope.

DESCRIPTION OF EMBODIMENTS

Preferred embodiments of the present invention will now be explained with reference to the drawings.

Embodiment 1

Figure 1:
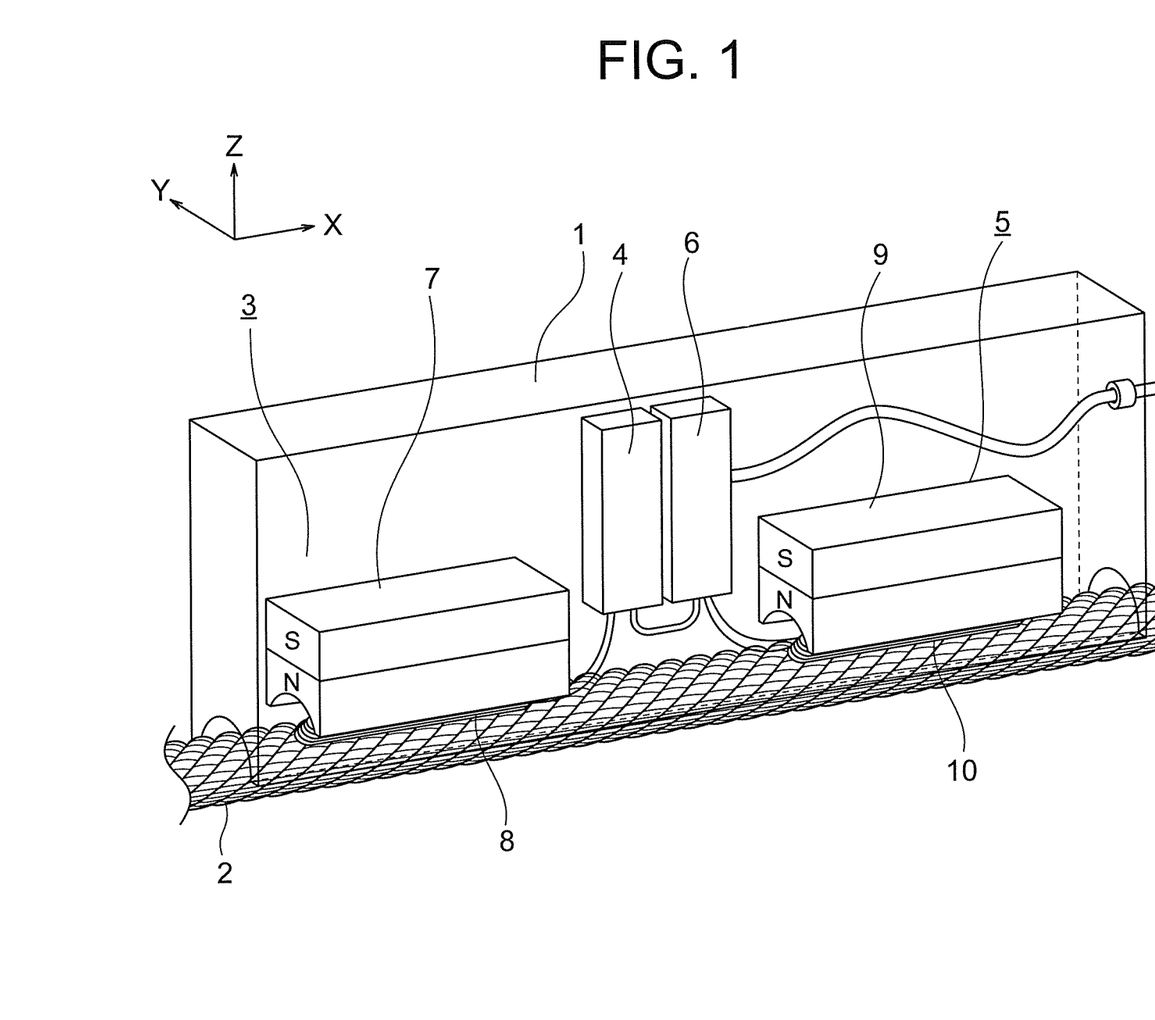
FIG. 1 is an oblique projection that shows a rope damage diagnostic testing apparatus according to Embodiment 1 of the present invention.
Figure 2:
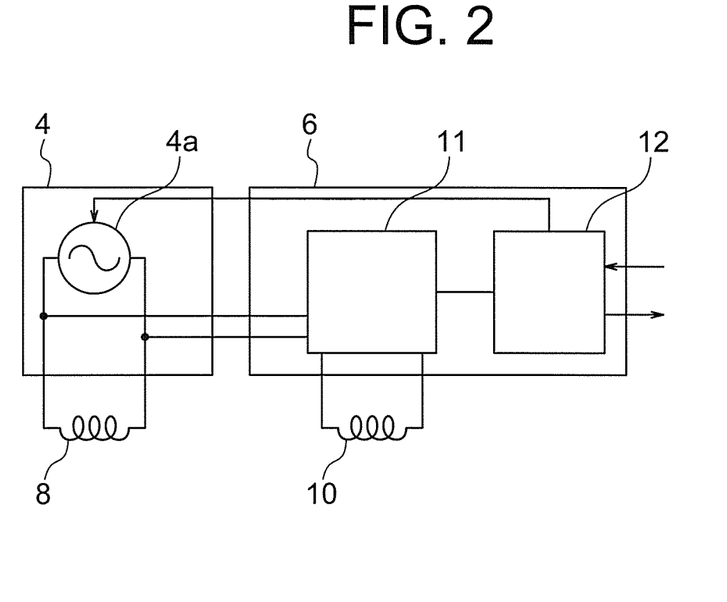
FIG. 2 is a circuit diagram for the rope damage diagnostic testing apparatus in FIG. 1.

FIG. 1 is an oblique projection that shows a rope damage diagnostic testing apparatus according to Embodiment 1 of the present invention, and FIG. 2 is a circuit diagram for the rope damage diagnostic testing apparatus in FIG. 1. In the figures, a housing 1 of a rope damage diagnostic testing apparatus is disposed so as to face a longitudinal portion of a wire rope 2. During testing of the wire rope 2, the wire rope 2 is moved relative to the housing 1. In FIG. 1, the housing 1 is represented transparently.

An ultrasound applicator 3, an excitation source 4, a detector 5, and a signal processing unit 6 are accommodated inside the housing 1. The ultrasound applicator 3 has an application magnet 7 and an excitation coil 8. The application magnet 7 is constituted by a permanent magnet, and applies a direct current magnetic field to the wire rope 2, which constitutes a magnetic body. The excitation coil 8 applies an alternating-current magnetic field to the wire rope 2, and makes induced currents (eddy currents, alternating currents) flow in a circumferential direction of the wire rope 2.

The ultrasound applicator 3 makes the wire rope 2 vibrate axially by magnetostriction effect, generating ultrasonic waves in the wire rope 2. The ultrasonic waves that are generated in the wire rope 2 propagate axially through the wire rope 2 along a helical structure of wires. If damage, i.e., wire breakage, is present in the wire rope 2, then the ultrasonic waves are reflected at the position of damage, or attenuate significantly.

The excitation source 4 is connected to the excitation coil 8, and has a radio-frequency source 4a that generates radio-frequency electric current in a kHz through MHz range.

The detector 5 is disposed so as to be spaced apart from the ultrasound applicator 3 in the longitudinal direction of the wire rope 2. The detector 5 has: a detection magnet 9; and a detecting coil 10 that functions as a detecting element. The detection magnet 9 is constituted by a permanent magnet, and applies a direct current magnetic field to the wire rope 2. The detecting coil 10 detects the ultrasonic waves that propagate through the wire rope 2 as an alternating-current voltage. The detecting coil 10 thereby detects changes in the state of propagation of the ultrasonic waves in the wire rope 2.

The signal processing unit 6 has a waveform determining circuit 11 and a control communications circuit 12. The waveform determining circuit 11 detects the presence or absence of wire breakage in the wire rope 2 from a radio-frequency electric current waveform and the detection voltage waveform in the detecting coil 10. The control communications circuit 12 controls the radio-frequency source 4a and the waveform determining circuit 11. The control communications circuit 12 also transmits measurement results, i.e., information concerning the presence or absence of wire breakage to an external computer. In addition, the control communications circuit 12 receives signals from the external computer such as operation settings, i.e., commencement and termination of measurement, frequency and amplitude of the radio-frequency source 4a, and criteria for wire breakage, etc.

Figure 3:
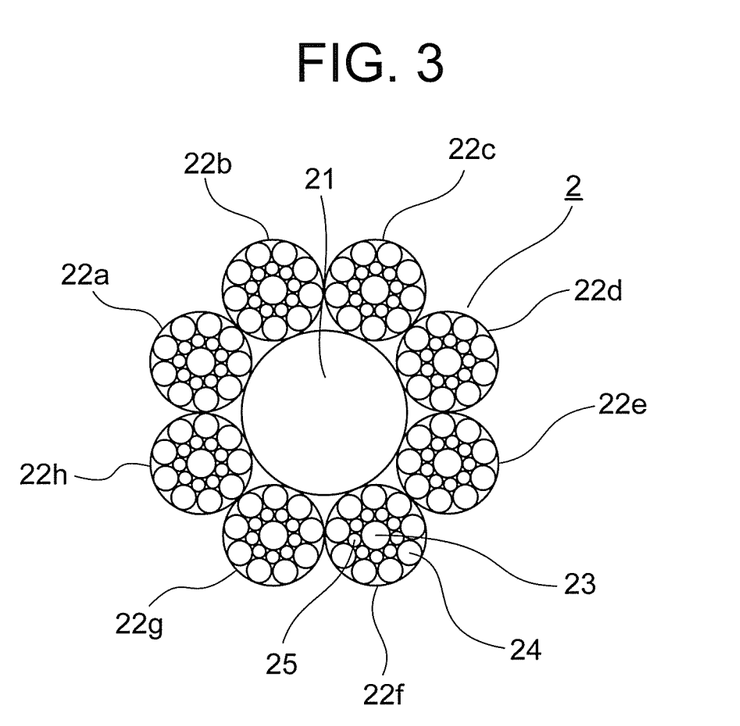
FIG. 3 is a cross section of a wire rope from FIG. 1.

FIG. 3 is a cross section of the wire rope 2 from FIG. 1, and shows a cross section that is perpendicular to a longitudinal direction. The wire rope 2 has: a core rope 21 that is disposed centrally; and a plurality of outer layer strands 22a through 22h that are twisted together around an outer circumference of the core rope 21. In this example, eight outer layer strands 22a through 22h are used. A cross-sectional construction of the core rope 21 is omitted in FIG. 3, but various constructions can be applied thereto.

Each of the outer layer strands 22a through 22h is a stranded wire that has: a steel central wire 23; nine steel outer layer wires 24 that are disposed on an outer circumference; and nine steel intermediate wires 25 that are disposed between the central wire 23 and the outer layer wires 24. A diameter of the intermediate wires 25 is smaller than a diameter of the central wire 23 and a diameter of the outer layer wires 24.

In elevator wire ropes 2, breakage of the outer layer wires 24 of the outer layer strands 22a through 22h at portions that contact sheaves, called "crown breakage", and breakage of the outer layer wires 24 at portions that contact adjacent outer layer strands 22a through 22h, called "valley breakage", may occur.

Figure 4:
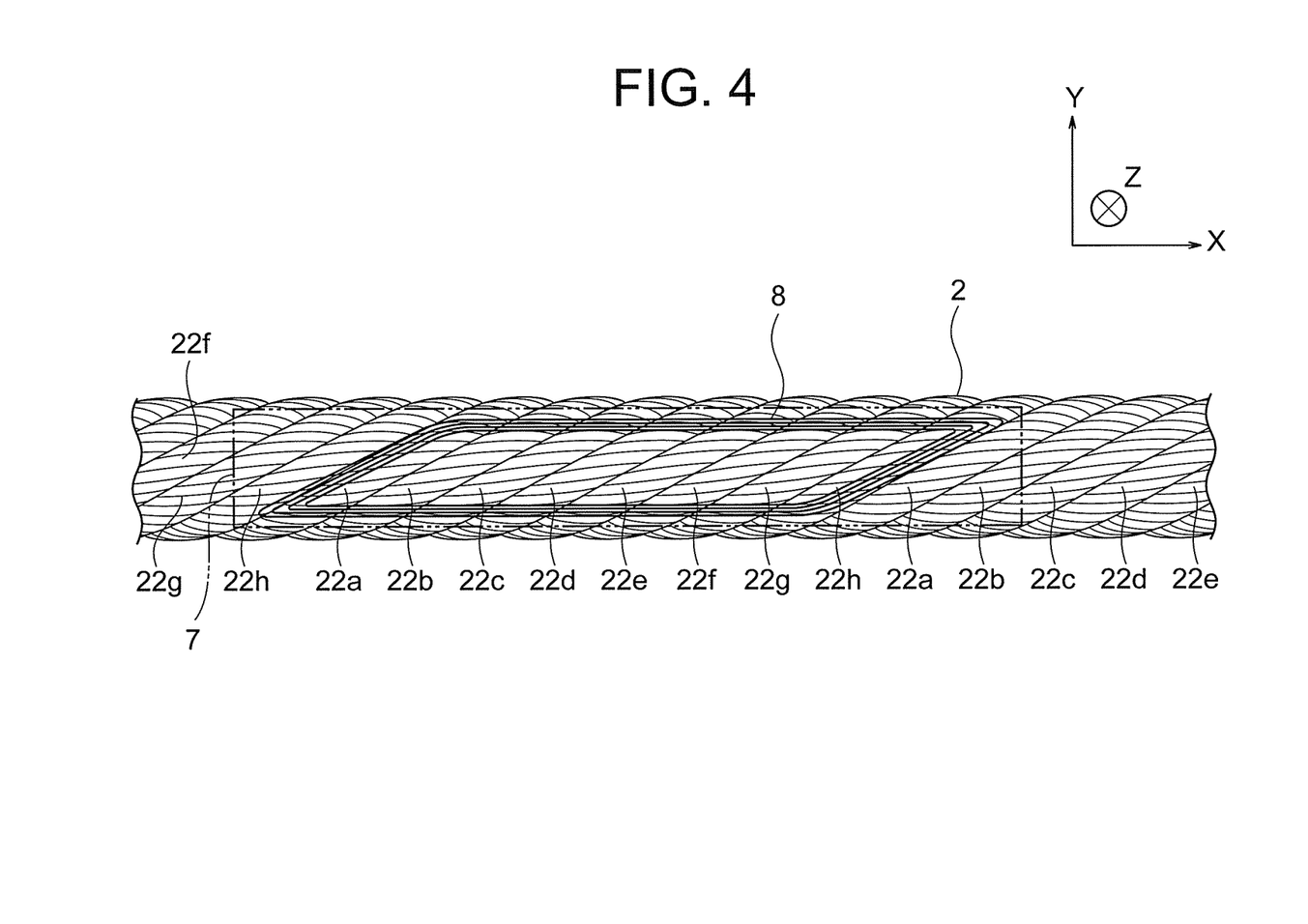
FIG. 4 is a configuration diagram that shows a layout of an excitation coil relative to the wire rope from FIG. 1 viewed parallel to a direction that is perpendicular to a longitudinal direction of the wire rope.

FIG. 4 is a configuration diagram that shows a layout of the excitation coil 8 relative to the wire rope 2 from FIG. 1 viewed parallel to a direction (a Z-axis direction) that is perpendicular to a longitudinal direction of the wire rope 8. The excitation coil 8 is disposed in a parallelogram that has as a first opposite side length a length of a portion of the wire rope 2 in which a single outer layer strand such as the outer layer strand 22a, for example, makes one revolution around the wire rope 2, and that has as a second opposite side length a product of a diameter and number of the outer layer wires 24 that are included in a single outer layer strand such as the outer layer strand 22a, for example.

In FIG. 4, the excitation coil 8 is disposed around the outer circumference of the parallelogram so as to completely surround the region of the above-mentioned parallelogram. Thus, the excitation coil 8 will not simultaneously apply ultrasonic waves to an identical outer layer wire 24 at two or more positions while applying the ultrasonic waves to all of the outer layer wires 24 of all of the outer layer strands 22a through 22h.

The detecting coil 10 is also disposed in a similar or identical manner to the excitation coil 8. Thus, the detecting coil 10 will not simultaneously detect ultrasonic waves from an identical outer layer wire 24 at two or more positions while detecting the ultrasonic waves from all of the outer layer wires 24 of all of the outer layer strands 22a through 22h.

The ultrasonic waves that are generated due to vibration of the wire rope 2 progress axially through the wire rope 2 along a helical structure of the outer layer wires 24. If there is any abnormality inside the wire rope 2, the ultrasonic waves reflect or attenuate at that position. The detector 5 detects the ultrasonic waves that progress through the wire rope 2 as an alternating-current voltage, by inverse transformation of the applied ultrasonic waves. Thus, damage to the wire rope 2 is detected from alternating-current voltage fluctuations.

In a rope damage diagnostic testing apparatus of this kind, because the excitation coil 8 and the detecting coil 10 are disposed on the above-mentioned parallelograms, presence or absence of damage to the wire rope 2 can be detected using a compact configuration, by facing only a circumferential portion of an outer circumferential surface of the wire rope 2.

Mounting and removal of the apparatus can thereby be easily performed in a short amount of time. Furthermore, even if two or more wire ropes 2 are disposed in close proximity, as in elevators, for example, the apparatus can still be easily mounted.

Figure 5:
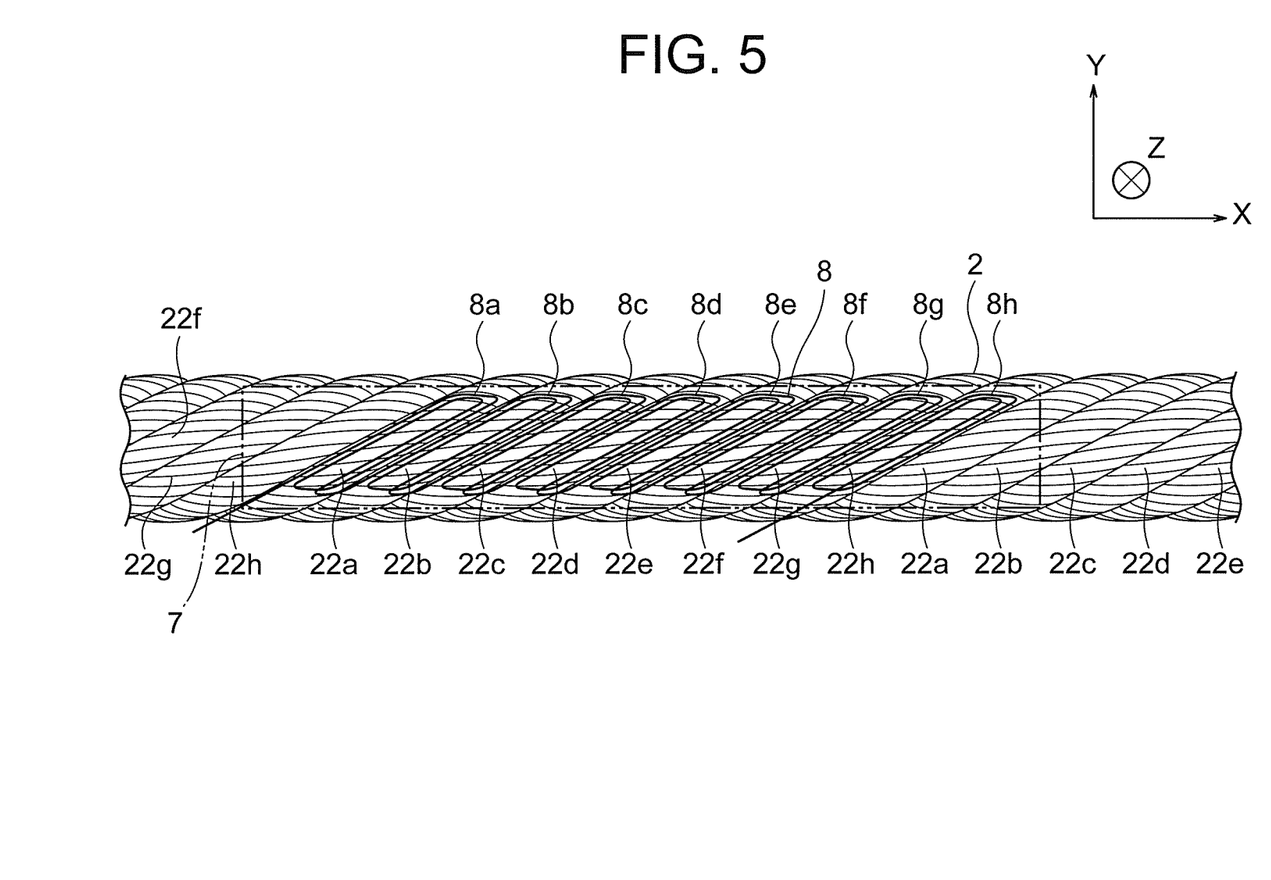
FIG. 5 is a configuration diagram that shows a first variation of the excitation coil in FIG. 4.
Figure 6:
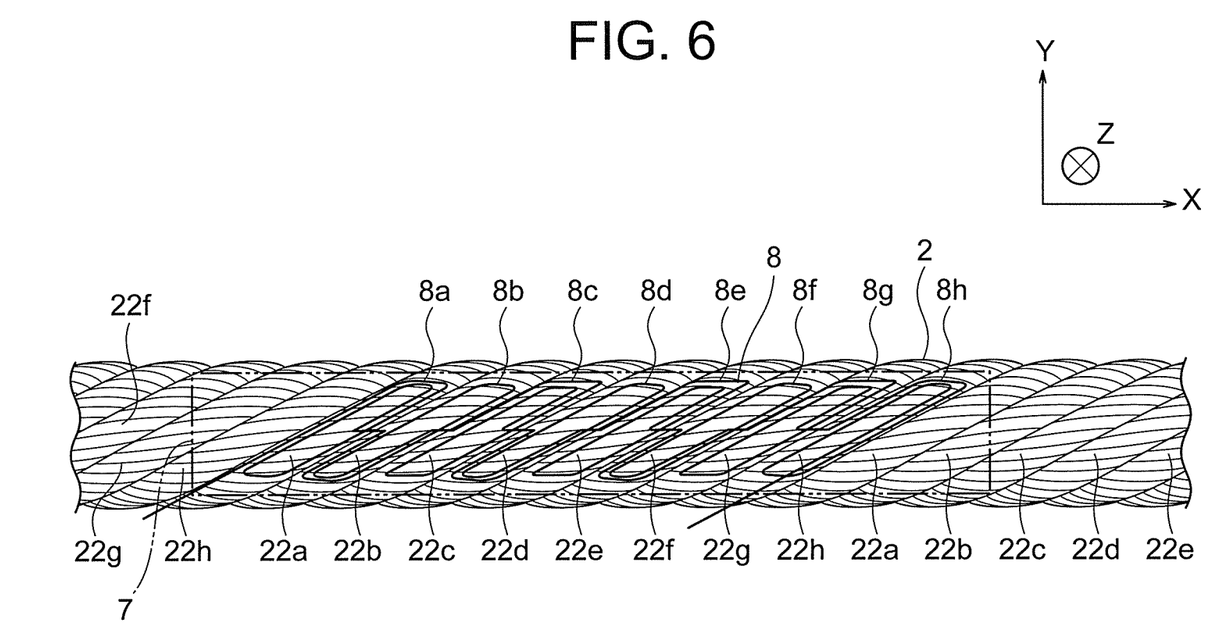
FIG. 6 is a configuration diagram that shows a second variation of the excitation coil in FIG. 4.

Moreover, in the above example, the excitation coil 8 is disposed so as to completely surround the region of the above-mentioned parallelogram, but the excitation coil 8 may be divided into segmented coils 8a through 8h that are equal in number to the outer layer strands 22a through 22h, such that adjacent segmented coils are connected, as shown in FIG. 5. As shown in FIG. 6, the adjacent segmented coils 8a through 8h may be connected in reverse directions. Modifications that are similar or identical to those of the excitation coil 8 are also possible in the detecting coil 10.

Figure 7:
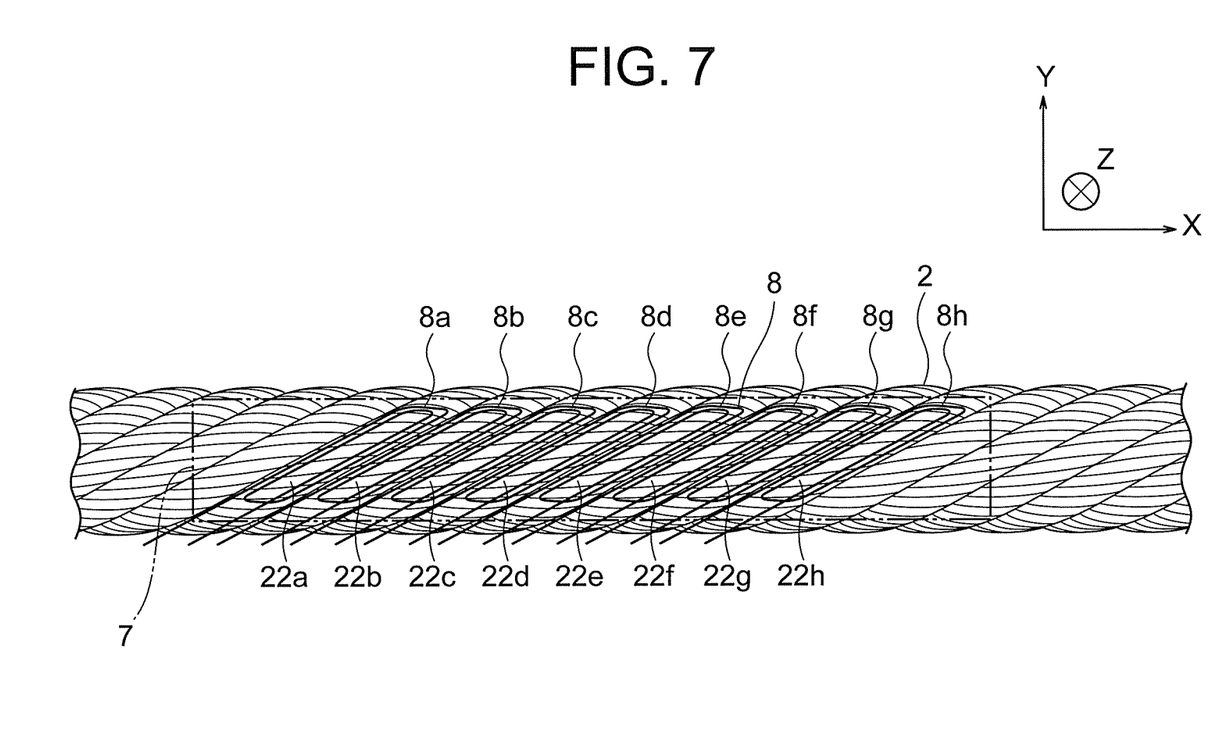
FIG. 7 is a configuration diagram that shows a third variation of the excitation coil in FIG. 4.

As shown in FIG. 7, ultrasonic waves may be applied to each of the outer layer strands 22a through 22h without connecting together the segmented coils 8a through 8h, ultrasonic waves also being detected in the detecting coil 10 for each of the outer layer strands 22a through 22h. The signal-to-noise ratio in the wire breakage detection can thereby be improved.

In addition, the detecting element is not limited to the detecting coil 10, and may be a Hall element, or a magnetoresistive element, for example. An anisotropic magnetoresistive (AMR) element, a giant magnetoresistive (GMR) element, or a tunnel magnetoresistive (TMR) element can be used as the magnetoresistive element.

Embodiment 2

Figure 8:
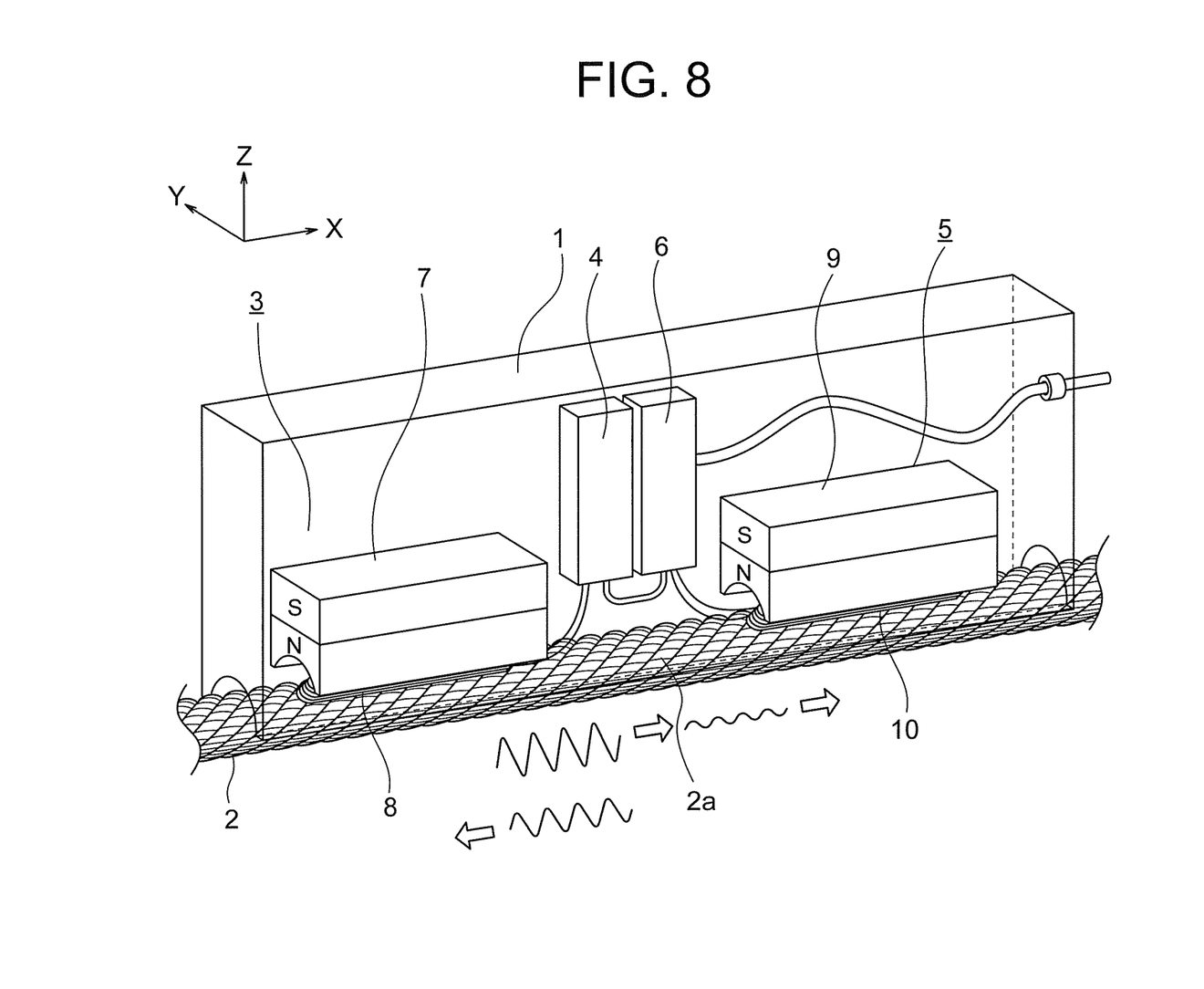
FIG. 8 is an oblique projection that shows a rope damage diagnostic testing apparatus according to Embodiment 2 of the present invention.

Next, FIG. 8 is an oblique projection that shows a rope damage diagnostic testing apparatus according to Embodiment 2 of the present invention. In Embodiment 2, an excitation coil 8 detects reflected ultrasound waves propagating through a wire rope 2 after applying ultrasonic waves. In other words, the excitation coil 8 is used as another detecting coil, and reflected waves from a damaged portion 2a of the wire rope 2 are detected by the excitation coil 8. A remainder of the configuration is similar or identical to that of Embodiment 1.

In a rope damage diagnostic testing apparatus of this kind, the signal-to-noise ratio in the wire breakage detection can be improved by detecting the reflected waves from the damaged portion 2a in addition to the ultrasonic waves that are transmitted through a portion of the wire rope 2 between the ultrasound applicator 3 and the detector 5.

Furthermore, by comparing the arrival times of the reflected ultrasound waves and the transmitted waves, the distance from the excitation coil 8 to the damaged portion 2a can be found, and ultrasonic wave velocity fluctuations due to fluctuations in tension of the wire rope 2 can be canceled.

Moreover, modification of the configuration of the excitation coil 8 and the detecting coil 10 in a similar or identical manner to Embodiment 1 is also possible in Embodiment 2.

Modification of the detecting element in the detector 5 in a similar or identical manner to Embodiment 1 is also possible in Embodiment 2.

Embodiment 3

Figure 9:
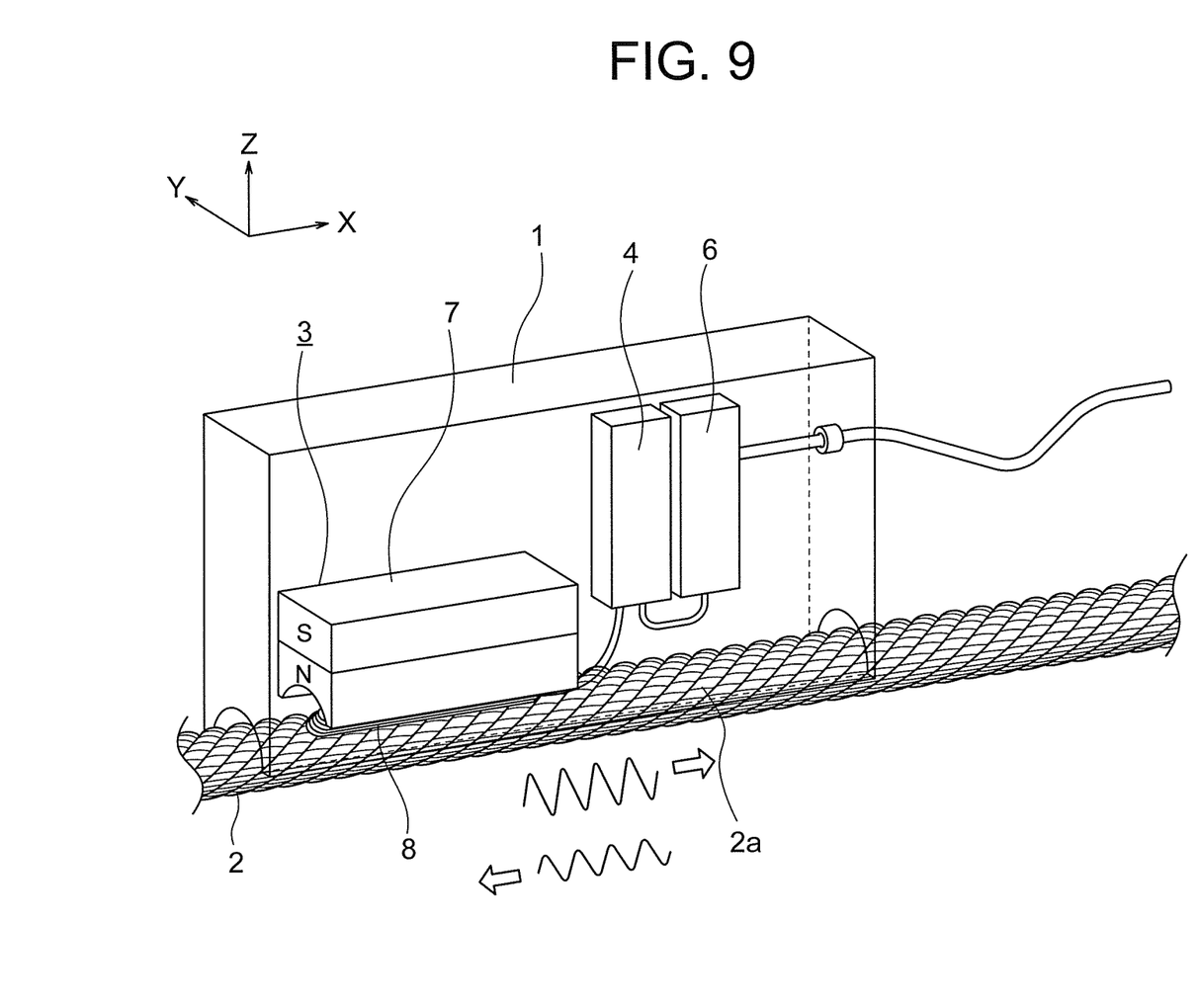
FIG. 9 is an oblique projection that shows a rope damage diagnostic testing apparatus according to Embodiment 3 of the present invention.

Next, FIG. 9 is an oblique projection that shows a rope damage diagnostic testing apparatus according to Embodiment 3 of the present invention. In Embodiment 3, a detector 5 is omitted from the configuration of Embodiment 2. The ultrasound applicator 3 also serves as a detector by making the excitation coil 8 also serve as a detecting element. The excitation coil 8 detects reflected ultrasound waves propagating through a wire rope 2 after applying ultrasonic waves. The signal processing unit 6 detects the presence or absence of wire breakage using the reflected ultrasound waves.

In a rope damage diagnostic testing apparatus of this kind, overall size can be reduced by omitting the detector 5.

Moreover, modification of the configuration of the excitation coil 8 in a similar or identical manner to Embodiment 1 is also possible in Embodiment 3.

In Embodiments 1 through 3, electromagnets may be used as the magnets that apply the direct current magnetic fields to the wire rope 2.

In addition, the rope damage diagnostic testing apparatus according to the present invention can also be applied to ropes other than elevator ropes.

The invention claimed is:

1. A rope damage diagnostic testing apparatus that detects presence or absence of damage in a wire rope around an outer circumference of which are disposed a plurality of outer layer strands, each of the outer layer strands including a plurality of outer layer wires that are disposed around an outer circumference thereof, the rope damage diagnostic testing apparatus comprising:
    an ultrasound applicator that includes:
        a magnet that applies a direct current magnetic field to the wire rope; and
        an excitation coil that applies an alternating-current magnetic field to the wire rope,
    the ultrasound applicator that generates ultrasonic waves in the wire rope by making the wire rope vibrate due to magnetostriction effect; and
    a detector that includes a detecting element that detects changes in a state of propagation of the ultrasonic waves in the wire rope,
    wherein the excitation coil and the detecting element are disposed in a parallelogram that has as a first opposite side length extending in a longitudinal direction of the wire rope and having a length of a portion of the wire rope in which one of the outer layer strands makes one revolution around the wire rope, the parallelogram having a second opposite side length a product of a diameter and number of the outer layer wires that are included in one of the outer layer strands.

2. The rope damage diagnostic testing apparatus according to claim 1, wherein:
    the magnet is an application magnet; and
    the detector comprises:
        a detection magnet that applies a direct current magnetic field to the wire rope; and
        a detecting coil that faces the wire rope, the detecting coil constituting the detecting element.

3. The rope damage diagnostic testing apparatus according to claim 2, wherein the excitation coil and the detecting coil are divided into segmented coils that are equal in number to the outer layer strands.

4. The rope damage diagnostic testing apparatus according to claim 3, wherein application and detection of ultrasonic waves is performed separately by each of the segmented coils.

5. The rope damage diagnostic testing apparatus according to claim 3, wherein reflected ultrasound waves that propagate through the wire rope are detected by the excitation coil.

6. The rope damage diagnostic testing apparatus according to claim 4, wherein reflected ultrasound waves that propagate through the wire rope are detected by the excitation coil.

7. The rope damage diagnostic testing apparatus according to claim 2, wherein reflected ultrasound waves that propagate through the wire rope are detected by the excitation coil.

8. The rope damage diagnostic testing apparatus according to claim 1, wherein reflected ultrasound waves that propagate through the wire rope are detected by the excitation coil.

9. The rope damage diagnostic testing apparatus according to claim 1, wherein the ultrasound applicator also serves as the detector by making the excitation coil also serve as the detecting element, reflected ultrasound waves that propagate through the wire rope being detected by the excitation coil.

* * * * *